United States Patent
Watanabe et al.

(10) Patent No.: US 10,831,880 B2
(45) Date of Patent: Nov. 10, 2020

(54) INFORMATION PROCESSING APPARATUS, INFORMATION PROCESSING SYSTEM, INFORMATION PROCESSING METHOD, AND COMPUTER-READABLE RECORDING MEDIUM FOR FACIAL RECOGNITION REGISTRATION AND VERIFICATION

(71) Applicants: Genki Watanabe, Tokyo (JP); Satoru Inokuchi, Aichi (JP)

(72) Inventors: Genki Watanabe, Tokyo (JP); Satoru Inokuchi, Aichi (JP)

(73) Assignee: Ricoh Company, Ltd., Tokyo (JP)

( * ) Notice: Subject to any disclaimer, the term of this patent is extended or adjusted under 35 U.S.C. 154(b) by 195 days.

(21) Appl. No.: 15/683,969

(22) Filed: Aug. 23, 2017

(65) Prior Publication Data

US 2018/0068110 A1 Mar. 8, 2018

(30) Foreign Application Priority Data

Sep. 7, 2016 (JP) .................. 2016-174874
Jul. 5, 2017 (JP) .................. 2017-132121

(51) Int. Cl.
*G06F 21/00* (2013.01)
*G06F 21/45* (2013.01)
(Continued)

(52) U.S. Cl.
CPC .............. *G06F 21/45* (2013.01); *G06F 21/32* (2013.01); *G06F 21/35* (2013.01); *G06F 21/608* (2013.01); *G06F 21/71* (2013.01)

(58) Field of Classification Search
CPC ........ G06F 21/45; G06F 21/608; G06F 21/35; G06F 21/32; G06F 21/71
See application file for complete search history.

(56) References Cited

U.S. PATENT DOCUMENTS 8,478,195 B1 * 7/2013 Hewinson ............ H04B 5/0031
235/379
9,584,687 B2 2/2017 Watanabe et al.
(Continued)

FOREIGN PATENT DOCUMENTS

JP 2008-236088 10/2008
JP 2012-088835 5/2012

OTHER PUBLICATIONS

U.S. Appl. No. 15/391,057, filed Dec. 27, 2016.

*Primary Examiner* — Brandon S Hoffman
*Assistant Examiner* — William A Corum, Jr.
(74) *Attorney, Agent, or Firm* — Harness, Dickey & Pierce, P.L.C.

(57) ABSTRACT

An information processing apparatus includes a storage unit configured to store therein address book information in which at least tag identification information for identifying a wireless tag that indicates a medium capable of performing wireless communication and personal information on a user are associated with each other, a tag identification information acquiring unit configured to acquire the tag identification information, a face information acquiring unit configured to refer to the address book information, and when face information on the user is not associated with the tag identification information, acquire the face information based on a captured image that is obtained by capturing an image of an imaging range corresponding to a range in which the tag identification information can be acquired, and a registration control unit configured to control registration of the face information in the address book information in association with the tag identification information.

16 Claims, 9 Drawing Sheets

(51) Int. Cl.
*G06F 21/32* (2013.01)
*G06F 21/35* (2013.01)
*G06F 21/71* (2013.01)
*G06F 21/60* (2013.01)

(56) References Cited

U.S. PATENT DOCUMENTS

| | | | |
|---|---|---|---|
| 2006/0090079 A1* | 4/2006 | Oh | G07C 9/00087 |
| | | | 713/186 |
| 2008/0007767 A1* | 1/2008 | Ishimaru | G06F 21/35 |
| | | | 358/1.15 |
| 2013/0070298 A1 | 3/2013 | Watanabe | |
| 2013/0136320 A1* | 5/2013 | Nishiguchi | G06K 9/00295 |
| | | | 382/118 |
| 2014/0149894 A1 | 5/2014 | Watanabe et al. | |
| 2015/0338898 A1 | 11/2015 | Yoshida et al. | |
| 2016/0050324 A1* | 2/2016 | Ohshita | G06F 16/9554 |
| | | | 358/1.15 |
| 2016/0094756 A1* | 3/2016 | Onishi | H04N 1/442 |
| | | | 358/1.13 |
| 2016/0094783 A1* | 3/2016 | Watanabe | G03G 15/5016 |
| | | | 348/77 |
| 2016/0277397 A1* | 9/2016 | Watanabe | G06F 16/5838 |
| 2017/0034383 A1* | 2/2017 | Suzuki | G06F 3/1218 |
| 2017/0220787 A1 | 8/2017 | Inokuchi et al. | |
| 2018/0054534 A1* | 2/2018 | Zhang | H04N 1/00514 |

\* cited by examiner

| USER INFORMATION | TAG NUMBER | FEATURE POINT INFORMATION |
|---|---|---|
| NAME: TARO YAMADA<br>E-mail: aaa@xxx.jp<br>... | eee912sa000··· | null |

| USER INFORMATION | TAG NUMBER | FEATURE POINT INFORMATION |
|---|---|---|
| NAME: TARO YAMADA<br>E-mail: aaa@xxx.jp<br>... | eee912sa000··· | 14149179904108341974 90801480180180810480 ... |

INFORMATION PROCESSING APPARATUS, INFORMATION PROCESSING SYSTEM, INFORMATION PROCESSING METHOD, AND COMPUTER-READABLE RECORDING MEDIUM FOR FACIAL RECOGNITION REGISTRATION AND VERIFICATION

CROSS-REFERENCE TO RELATED APPLICATIONS

The present application claims priority under 35 U.S.C. § 119 to Japanese Patent Application No. 2016-174874, filed on Sep. 7, 2016 and Japanese Patent Application No. 2017-132121, filed on Jul. 5, 2017. The contents of which are incorporated herein by reference in their entirety.

BACKGROUND OF THE INVENTION

1. Field of the Invention

The present invention relates to an information processing apparatus, an information processing system, an information processing method, and a computer-readable recording medium.

2. Description of the Related Art

Conventionally, there is a known technology for authenticating a user who uses a multifunction peripheral (MFP), by using a face authentication technique. For example, Japanese Patent Application Laid-open No. 2012-88835 discloses a complex authentication method in which an authentication method to perform authentication by acquiring biological information, such as a face, and an authentication method to perform authentication by wirelessly reading information in a tag are combined.

However, in a system using the conventional face authentication method, for example, an administrator of an apparatus, such as an MFP, (an apparatus to be enabled based on authentication) needs to perform, in advance, an operation of registering personal information (a name, an address, an e-mail address, and the like) on each user, an operation of capturing a face image to be a basis of face information used for face authentication, and an operation of registering the personal information and the face information based on the captured image in an associated manner. That is, the efficiency of the process of registering the face information used for the face authentication is low.

The present invention has been made in view of the above circumstances, and an object is to provide an information processing apparatus, an information processing system, an information processing method, and a computer-readable recording medium capable of improving the efficiency of the process of registering the face information used for the face authentication.

SUMMARY OF THE INVENTION

Brief Description of the Drawings

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
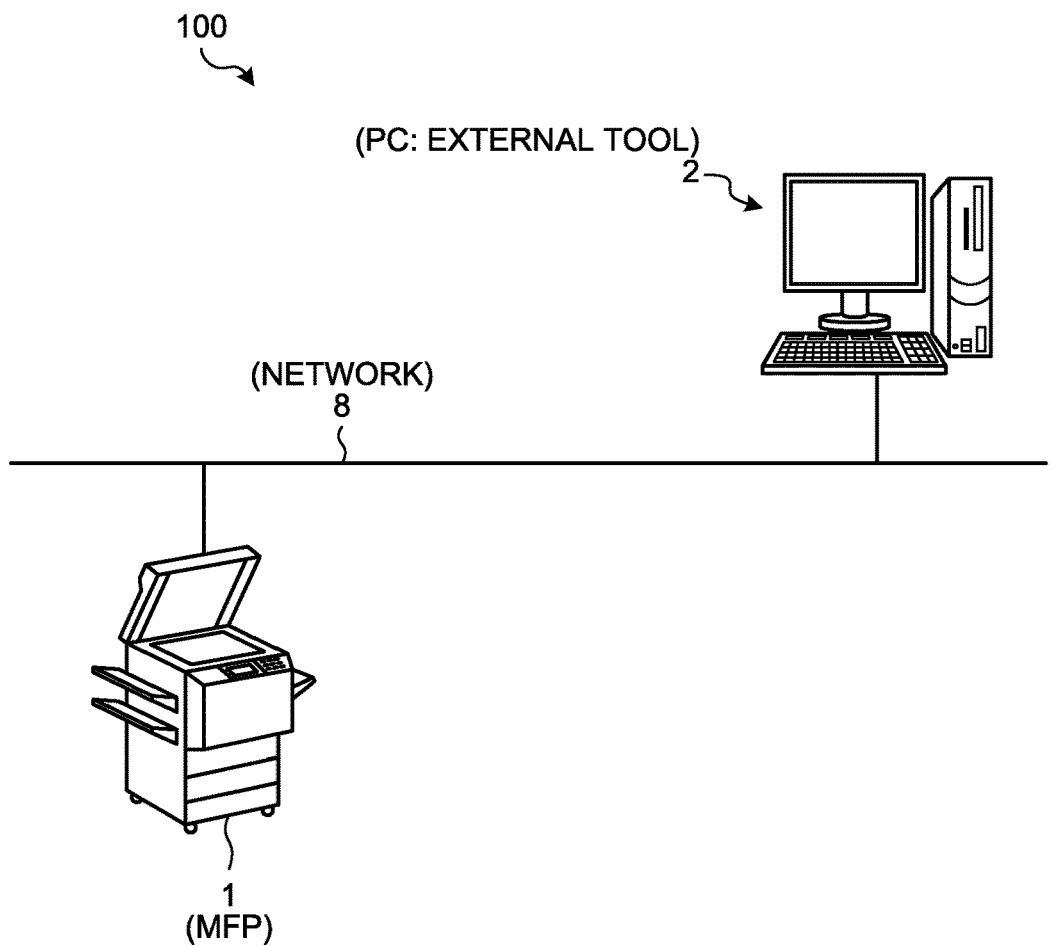
FIG. 1 is a diagram illustrating an example of a configuration of an information processing system according to a first embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

First Embodiment

An embodiment of an information processing apparatus, an information processing system, an information processing method, and a computer-readable recording medium according to the present invention will be described in detail below with reference to the accompanying drawings. In the following descriptions, a multifunction peripheral (MFP) that is one of image processing apparatuses will be described as an example of the information processing apparatus according to the present invention; however, the embodiment is not limited to this example. For example, examples of the information processing apparatus include a camera, a projector, an interactive whiteboard (an electronic blackboard), a dedicated terminal for a teleconference/web conference system, a digital signage, a production printer, a 3D printer, and a facsimile machine. Namely, the information processing apparatus may be any apparatus to be enabled based on authentication, and the types of the apparatus may be arbitrary. The MFP is an apparatus including a plurality of different functions, such as a copy function, a scanner function, a printer function, and a facsimile function.

FIG. 1 is a diagram illustrating an example of a configuration of an information processing system 100 according to a first embodiment. As illustrated in FIG. 1, the information processing system 100 includes an MFP 1 and a personal computer (PC) 2 that functions as an external tool, both of which are connectable to each other via a network 8, such as the Internet. As will be described later, the PC 2 performs a process of registering, in address book information to be described later, personal information (a name, an address, an e-mail address, and the like) on a user and a tag number (an example of tag identification information) for identifying a wireless tag that is a medium capable of performing wireless communication, in response to an operation performed by an administrator of the MFP 1.

Figure 2:
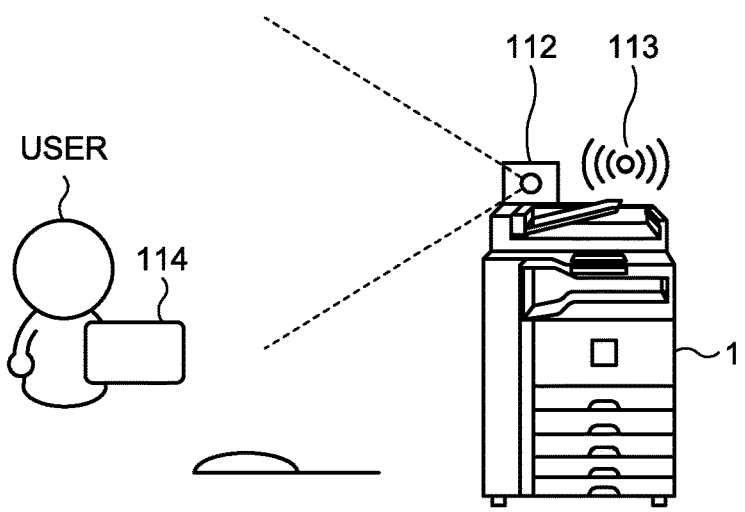
FIG. 2 is a diagram for explaining a condition in which a user carrying a wireless tag passes the wireless tag over a tag reader in the information processing system according to the first embodiment.

In this example, wireless tags 114 in which tag numbers are stored are respectively distributed to one or more users who use the MFP 1. As illustrated in FIG. 2, when a user carrying the wireless tag 114 passes the wireless tag 114 over a tag reader 113 mounted in the MFP 1, the wireless tag 114 and the tag reader 113 perform near field communication, and the tag reader 113 reads the tag number stored in the wireless tag 114. Furthermore, in this example, a camera 112 for capturing an image of an imaging range corresponding to a range in which the tag number can be acquired (in other words, the camera 112 for capturing an image of the user who passes the wireless tag 114 over the tag reader 113) is connected to the MFP 1. It is possible to detect a face image of the user who holds the wireless tag 114 from a captured image obtained through imaging performed by the camera 112, and perform authentication of the user by using the detected face image. Details will be described later. The imaging indicates conversion of an image of an object formed by an optical system, such as a lens, into an electrical signal.

Figure 3:
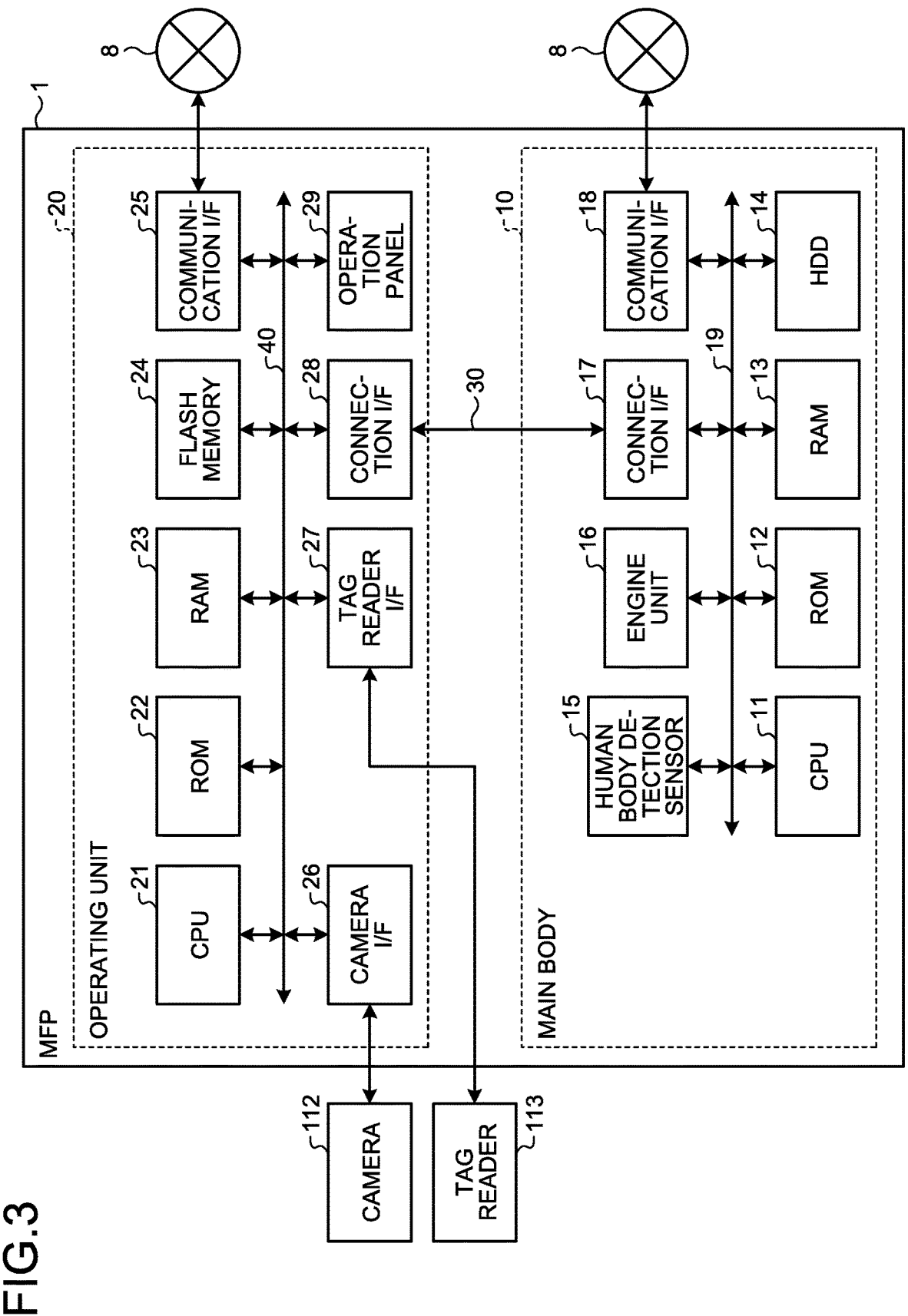
FIG. 3 is a diagram illustrating a hardware configuration example of an MFP according to the first embodiment.

FIG. 3 is a hardware configuration diagram of the MFP 1 according to the first embodiment. The MFP 1 is an image processing apparatus including an operating unit 20 that receives an operation and a main body 10 that operates in accordance with the operation received by the operating unit 20. In this example, the main body 10 has various functions, such as a copy function, a scanner function, a facsimile function, and a printer function, for example.

In the example illustrated in FIG. 3, the main body 10 and the operating unit 20 are communicably connected to each other via a dedicated communication channel 30. As the communication channel 30, for example, a channel based on the universal serial bus (USB) standard may be used or a channel based on an arbitrary standard may be used regardless of whether it is wired or wireless. Furthermore, the main body 10 may include one or a plurality of image forming functions, such as a copy function, a scanner function, a facsimile function, and a printer function.

As the operating unit 20, an electronic device that can independently execute complete information processing may be used. As one example, an information processing terminal, such as a smartphone or a tablet terminal, may be used as the operating unit 20. In this case, the information processing terminal used as the operating unit 20 functions as an operating unit of the MFP 1.

More specifically, the information processing terminal used as the operating unit 20 is connected to the MFP 1 in an attachable/detachable manner, instead of a conventional operation panel that has been fixedly mounted as an operating unit dedicated to the MFP 1. That is, the information processing terminal used as the operating unit 20 is integrally mounted in the MFP 1 in a predetermined position, such as a position where the operation panel of the MFP 1 is provided, in a detachable (separable) manner. Therefore, the information processing terminal used as the operating unit 20 and the MFP 1 may be recognized as a single apparatus. The information processing terminal used as the operating unit 20, when detached from the MFP 1, performs wireless communication, such as Bluetooth (registered trademark) communication or infrared communication, with the MFP 1 and functions as the operating unit of the MFP 1.

Hardware Configuration of Main Body

Next, a hardware configuration of the main body 10 will be described. As illustrated in FIG. 3, the main body 10 includes a central processing unit (CPU) 11, a read only memory (ROM) 12, a random access memory (RAM) 13, a hard disk drive (HDD) 14, a human body detection sensor 15, an engine unit 16, a connection interface (I/F) 17, and a communication I/F 18. All of the above-described units 11 to 18 are connected to one another via a system bus 19.

The CPU 11 integrally controls operations of the main body 10. The CPU 11 executes a program stored in the ROM 12, the HDD 14, or the like by using the RAM 13 as a work area (workspace), to thereby control the operations of the entire main body 10 and implement various kinds of functions, such as the copy function, the scanner function, the facsimile function, and the printer function, as described above.

The human body detection sensor 15 is a sensor that detects presence or absence of a human body in a detection range. Here, the detection range is a range including at least the imaging range of the camera 112. As the human body detection sensor 15, for example, a pyroelectric sensor or the like may be used.

The engine unit 16 is hardware that performs processing other than general-purpose information processing and communications, for implementing the copy function, the scanner function, the facsimile function, the printer function, and the like. The engine unit 16 includes, for example, a scanner that scans and reads an image of a document, a plotter that performs printing on a sheet material, such as a sheet of paper, a facsimile communication unit that performs facsimile communication, and the like. The engine unit 16 may also include a specific option, such as a finisher that sorts a printed sheet material and an automatic document feeder (ADF) that automatically feeds a document.

The connection I/F 17 is an interface for communicating with the operating unit 20 via the communication channel 30. In FIG. 3, the communication channel 30 is illustrated in a wired manner; however, as described above, the operating unit 20 is attachable to and detachable from the main body 10 of the MFP 1. Therefore, the communication channel 30 functions as a wired communication channel when the operating unit 20 is attached to the MFP 1, and the communication channel 30 functions as a wireless communication channel when the operating unit 20 is detached from the MFP 1. The communication I/F 18 is an interface for communicating with an external apparatus, such as the PC 2, on the network 8.

Hardware Configuration of Operating Unit

Next, a hardware configuration of the operating unit 20 will be described below. As illustrated in FIG. 3, the operating unit 20 includes a CPU 21, a ROM 22, a RAM 23, a flash memory 24, a communication I/F 25, a camera I/F 26, a tag reader I/F 27, a connection I/F 28, and an operation panel 29, all of which are connected to one another via a system bus 40.

The CPU 21 integrally controls operations of the operating unit 20. The CPU 21 executes a program stored in the ROM 22 or the flash memory 24 by using the RAM 23 as a work area (workspace), to thereby control the operations of the entire operating unit 20. The communication I/F 25 is an interface for communicating with an external apparatus, such as the PC 2, on the network 8.

The camera I/F 26 is an interface for connecting to the camera 112 that captures an image of a predetermined imaging range. The tag reader I/F 27 is an interface for connecting to the tag reader 113. The tag reader 113 is a device that performs near field communication with the wireless tag 114 in the detection range and reads (receives) the tag number stored in the wireless tag 114. Communication methods between the wireless tag 114 and the tag reader 113 include an Active type in which the wireless tag 114 transmits radio waves and a Passive type in which the tag reader 113 transmits radio waves and the wireless tag 114 that has received the radio waves returns a response. Here, the imaging range of the camera 112 corresponds to a range in which the tag reader 113 can receive (acquire) the tag number. Namely, the imaging range of the camera 112 is set to a range in which an image of a user who passes the wireless tag 114 over the tag reader 113 can be captured.

In this example, it is assumed that the camera 112 and the operating unit 20 or the tag reader 113 and the operating unit 20 are provided as physically separate devices and connected via a USB cable or the like. However, the camera 112 and the tag reader 113 may be built in the operating unit 20. That is, the operating unit 20 and the camera 112 or the operating unit 20 and the tag reader 113 may be integrated with each other (may be constructed as a single device).

The connection I/F 28 is an interface for communicating with the main body 10 via the communication channel 30. The operation panel 29 is constructed by a liquid crystal display (LCD) including a touch sensor. The operation panel 29 receives various kinds of input corresponding to operations performed by a user, and displays various kinds of information, such as information corresponding to the received input, information indicating an operating condition of the MFP 1, or information indicating a setting state. The operation panel 29 may be constructed by an organic electroluminescent (EL) display including a touch sensor. Furthermore, in addition to or in place of the operation panel 29, an operating unit, such as a hardware key, or a display unit, such as a light-emitting unit, may be provided.

Software Configuration of MFP

Figure 4:
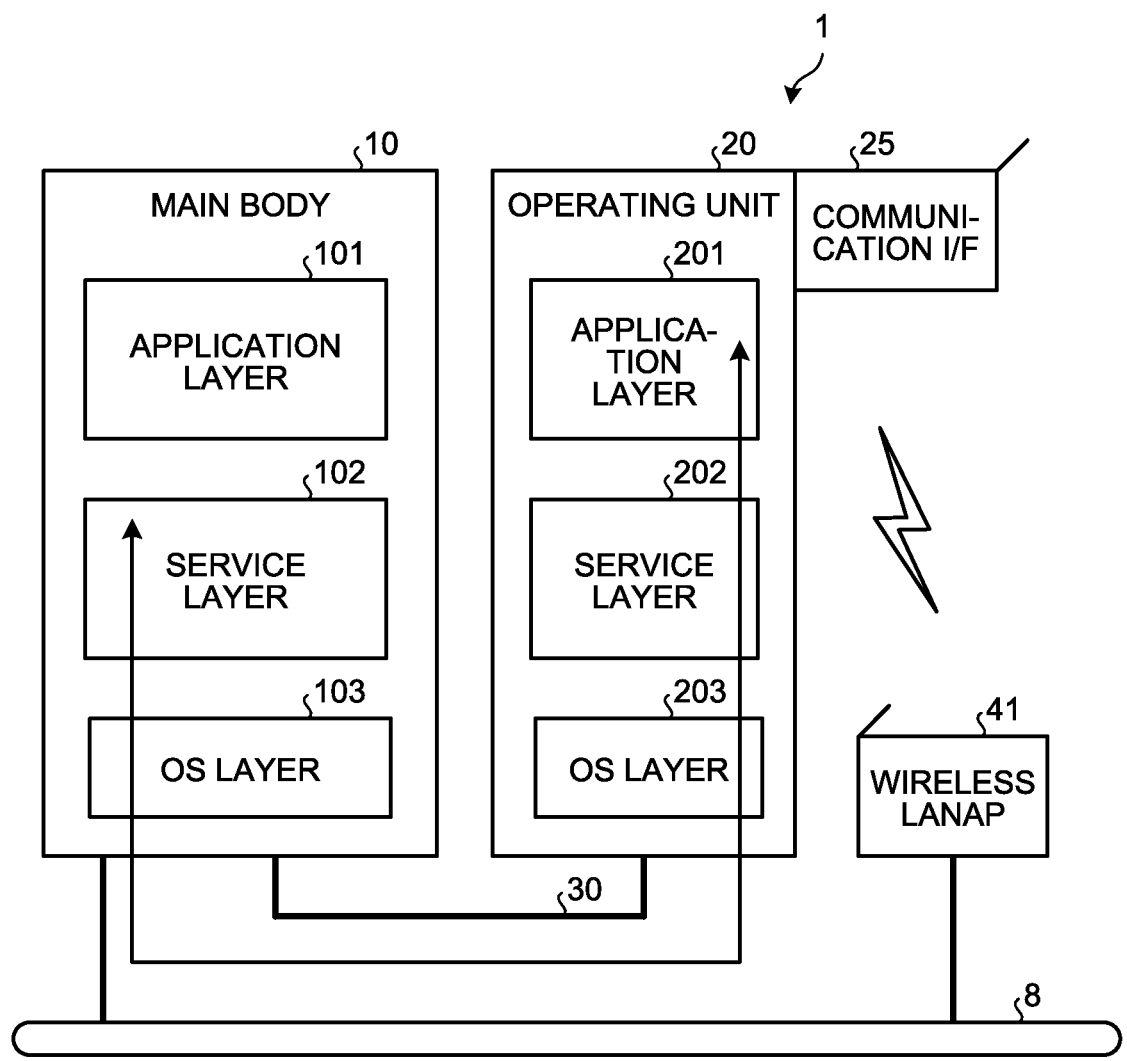
FIG. 4 is a diagram illustrating a software configuration example of the MFP according to the first embodiment.

FIG. 4 illustrates an example of a software configuration of the MFP 1. As illustrated in FIG. 4, the main body 10 includes an application layer 101, a service layer 102, and an operating system (OS) layer 103 (a first operating system). Substance of the application layer 101, the service layer 102, and the OS layer 103 is various kinds of software stored in the ROM 12, the HDD 14, or the like. The CPU 11 executes the various kinds of software to provide various kinds of functions.

Software of the application layer 101 is application software (hereinafter, may be simply referred to as an "application") for operating a hardware resource and providing a predetermined function. For example, examples of the application include a copy application for providing a copy function, a scanner application for providing a scanner function, a facsimile application for providing a facsimile function, and a printer application for providing a printer function.

Software of the service layer 102 is software that is interposed between the application layer 101 and the OS layer 103 and used for providing an interface for using a hardware resource of the main body 10 to an application. Specifically, the software of the service layer 102 is software for providing a function to receive operation requests for hardware resources and arbitrate the operation requests. Examples of the operation requests received by the service layer 102 include a request for reading by the scanner and a request for printing by the plotter.

An interface function of the service layer 102 is provided not only to the application layer 101 of the main body 10 but also to an application layer 201 of the operating unit 20. That is, the application layer 201 (application) of the operating unit 20 can implement a function using the hardware resources (for example, the engine unit 16) of the main body 10 through the interface function of the service layer 102.

Software of the OS layer 103 is basic software (operating system) for providing a basic function to control hardware of the main body 10. The software of the service layer 102 converts a hardware-resource use request received from various kinds of applications to a command that can be interpreted by the OS layer 103, and sends the command to the OS layer 103. The software of the OS layer 103 executes the command, so that the hardware operates in accordance with the request received from the application.

Similarly, the operating unit 20 includes the application layer 201, a service layer 202, and an OS layer 203 (a second operating system). A hierarchical structure of the application layer 201, the service layer 202, and the OS layer 203 of the operating unit 20 is the same as that of the main body 10. However, functions provided by an application of the application layer 201 and types of operation requests that can be received by the service layer 202 are different from those of the main body 10. The application of the application layer 201 is software for operating a hardware resource of the operating unit 20 and providing a predetermined function. The application of the application layer 201 is software for mainly providing a user interface (UI) function to perform operations and display in relation to the functions (the copy function, the scanner function, the facsimile function, and the printer function) included in the main body 10.

In the example of the first embodiment, the software of the OS layer 103 in the main body 10 and the software of the OS layer 203 in the operating unit 20 are different from each other in order to maintain the independence of the functions. That is, the main body 10 and the operating unit 20 operate independently of each other on different operating systems. For example, it may be possible to use Linux (registered trademark) as the software of the OS layer 103 in the main body 10 and use Android (registered trademark) as the software of the OS layer 203 in the operating unit 20.

By causing the main body 10 and the operating unit 20 to operate on different operating systems, communication between the main body 10 and the operating unit 20 is performed as communication between different devices, rather than as inter-process communication in a common apparatus. An operation (command communication) performed by the operating unit 20 to send received input (a content of an instruction from a user) to the main body 10 and an operation performed by the main body 10 to provide an event to the operating unit 20 correspond to the communication between different devices. Here, the operating unit 20 can use the functions of the main body 10 by performing command communication with the main body 10. Furthermore, the event provided from the main body 10 to the operating unit 20 may be an operation execution state in the main body 10, information defined by the main body 10, or the like.

Moreover, in the example of the first embodiment, power is supplied from the main body 10 to the operating unit 20 through the communication channel 30; therefore, it is possible to perform power supply control of the operating unit 20 separately from (independently of) power supply control of the main body 10.

In this example, the main body 10 and the operating unit 20 are electrically and physically connected to each other via the communication channel 30; however, it is possible to detach the operating unit 20 from the main body 10 as described above. In this case, the main body 10 and the operating unit 20 are provided with near field communication units, such as infrared communication units, RF communication units, or Bluetooth (registered trademark) communication units. RF is an abbreviation of a "Radio Frequency". Alternatively, the main body 10 and the operating unit 20 may be provided with wireless LAN communication functions, such as Wi-Fi (registered trademark), and may be enabled to communicate with each other via a wireless LAN access point (wireless LANAP) 41 and the network 8 as illustrated in FIG. 4. LAN is an abbreviation of a "Local Area Network". If the operating unit 20 is detachable from the main body 10, the operating unit 20 stores power supplied from the main body 10 via the communication channel 30 in a secondary battery, and when detached from the main body 10, operates and performs communication with the main body 10 by using the power stored in the secondary battery.

Figure 5:
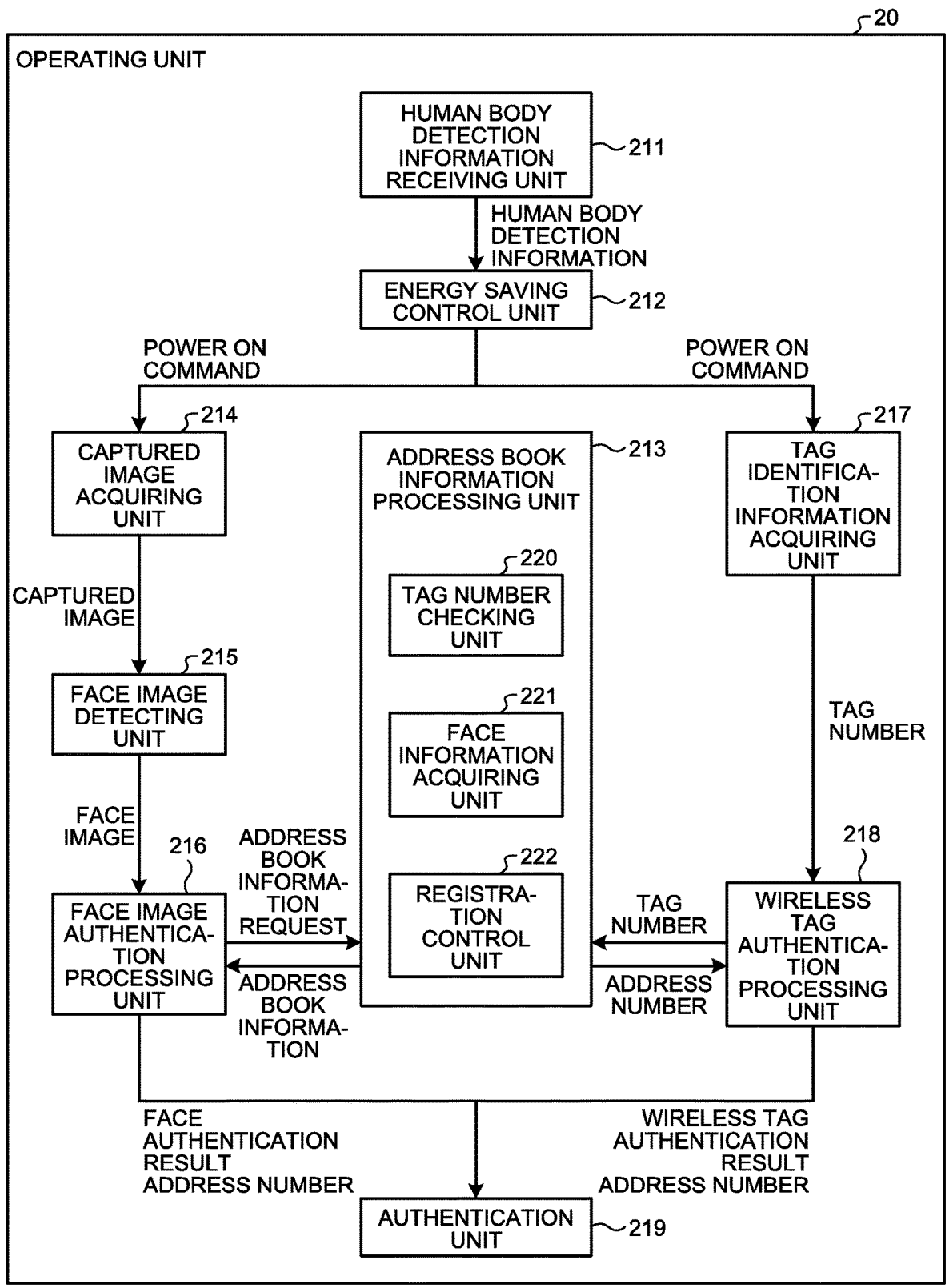
FIG. 5 is a diagram illustrating an example of functions included in the MFP according to the first embodiment.

Next, functions included in the MFP 1 will be described. FIG. 5 is a diagram illustrating an example of functions included in the operating unit 20 of the MFP 1. As illustrated in FIG. 5, the operating unit 20 includes a human body detection information receiving unit 211, an energy saving control unit 212, an address book information processing unit 213, a captured image acquiring unit 214, a face image detecting unit 215, a face image authentication processing unit 216, a tag identification information acquiring unit 217, a wireless tag authentication processing unit 218, and an authentication unit 219. For convenience of explanation, functions related to the present invention are mainly illustrated in FIG. 5; however, the functions included in the operating unit 20 are not limited thereto. For example, a part of the above-described functions may be provided in the main body 10.

The human body detection information receiving unit 211 receives (acquires) human body detection information indicating presence or absence of a human body in the detection range from the human body detection sensor 15. The human body detection information receiving unit 211 sends the human body detection information received from the human body detection sensor 15 to the energy saving control unit 212.

When in an energy saving state indicating lower power consumption than a normal state in which the operating unit 20 can operate, if the energy saving control unit 212 receives the human body detection information indicating that a human body is present in the detection range from the human body detection information receiving unit 211, the energy saving control unit 212 causes each of the captured image acquiring unit 214 and the tag identification information acquiring unit 217 to return to an operable state (transmits a power ON command).

The address book information processing unit 213 provides, to each of the face image authentication processing unit 216 and the wireless tag authentication processing unit 218 to be described later, address book information in which at least the tag number (an example of the tag identification information) for identifying the wireless tag 114 and personal information on a user are associated with each other. The address book information may be stored in the flash memory 24 in the operating unit 20, may be stored in the HDD 14 in the main body 10, or may be stored in an external server, for example. That is, any of the flash memory 24, the HDD 14, and the external server functions as a "storage unit".

Figures 6, 7, 8:
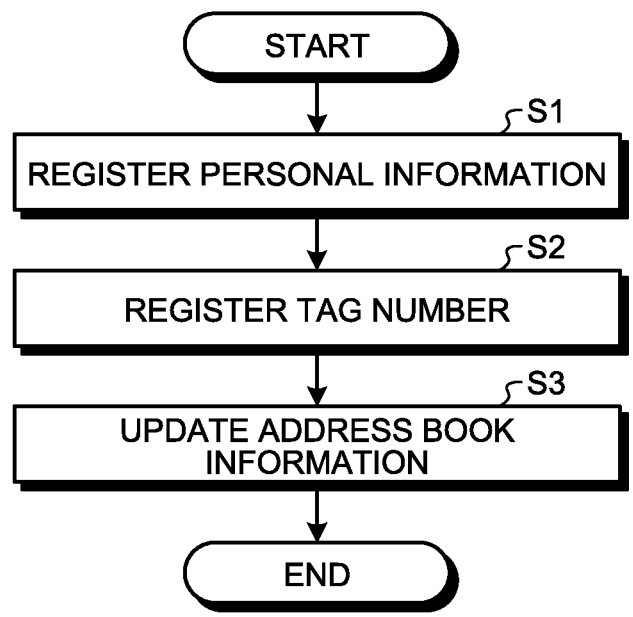
FIG. 6 is a diagram illustrating an example of default address book information according to the first embodiment.
FIG. 7 is a diagram illustrating an example of address book information obtained after registration of feature point information according to the first embodiment.
FIG. 8 is a flowchart illustrating an example of an operation performed by a PC according to the first embodiment.

The address book information according to the first embodiment is information in which user information, the tag number, and face information on a user are associated with one another. In this example, the face information is feature point information indicating a feature point included in a face image of the user; however, the face information is not limited to this example, but may be the face image, for example. The administrator of the MFP 1 performs, in advance, an operation of registering the user information and the tag number among pieces of information included in the address book information, by operating the PC 2. The address book information in an initial state, in which the registration operation performed by the administrator is completed (hereinafter, this address book information may be referred to as "default address book information"), is configured as illustrated in FIG. 6, where nothing is input in the feature point information ("null"). In this example, for each combination of a single piece of user information, a single tag number, and a single piece of feature point information (i.e., an information group in one row), a number for identifying the combination is assigned (hereinafter, the number may be referred to as an "address number").

Explanation of FIG. 5 is continued. As illustrated in FIG. 5, the address book information processing unit 213 includes a tag number checking unit 220, a face information acquiring unit 221, and a registration control unit 222. Every time the tag identification information acquiring unit 217 to be described later acquires a tag number, the tag number checking unit 220 receives the acquired tag number from the wireless tag authentication processing unit 218 to be described later. The tag number checking unit 220 determines whether the tag number acquired by the tag identification information acquiring unit 217 (the tag number received from the wireless tag authentication processing unit 218) is present in the address book information, transmits a corresponding address number to the wireless tag authentication processing unit 218 when the tag number is present in the address book information, and transmits an error when the tag number is not present in the address book information. Furthermore, when the tag number acquired by the tag identification information acquiring unit 217 (the tag number received from the wireless tag authentication processing unit 218) is present in the address book information, the tag number checking unit 220 provides the tag number to the face information acquiring unit 221.

The face information acquiring unit 221 refers to the address book information, and if the face information on the user is not associated with the tag number acquired by the tag identification information acquiring unit 217 to be described later, acquires the face information based on a captured image that is obtained by capturing an image of the imaging range corresponding to the range in which the tag number can be acquired. In the first embodiment, the face information acquiring unit 221 acquires the face information based on a face image detected by the face image detecting unit 215 to be described later. More specifically, the face information acquiring unit 221 refers to the address book information, and if feature point information (an example of the face information) is not associated with the tag number provided by the tag number checking unit 220, transmits a face image request to request a face image to the face image detecting unit 215 to be described later, and acquires the face image in response to the request. The face information acquiring unit 221 extracts a feature point included in the face image and acquires (generates) the feature point information. The face information acquiring unit 221 then notifies the registration control unit 222 of the feature point information acquired as described above and the tag number provided from the tag number checking unit 220.

The registration control unit 222 controls registration of the feature point information acquired by the face information acquiring unit 221 in the address book information in association with the tag number. In this example, the registration control unit 222 controls registration of the feature point information provided from the face information acquiring unit 221 and the tag number in the address book information in an associated manner. FIG. 7 is a diagram illustrating an example of the address book information obtained after the registration control unit 222 has registered the feature point information.

Explanation of FIG. 5 is continued. The captured image acquiring unit 214 acquires, from the camera 112, a captured image obtained through imaging performed by the camera 112. In this example, when a person enters the detection range, the captured image acquiring unit 214 starts to operate, and acquires a captured image from the camera 112. The captured image acquiring unit 214 sends the captured image acquired from the camera 112 to the face image detecting unit 215.

The face image detecting unit 215 detects a face image from the captured image acquired by the captured image acquiring unit 214. The face image detecting unit 215 waits to receive the above-described face image request for a predetermined period, transmits the detected face image to each of the face information acquiring unit 221 and the face image authentication processing unit 216 when receiving the face image request, and transmits the detected face image to only the face image authentication processing unit 216 when not receiving the face image request. Here, when the face image is transmitted to each of the face information acquiring unit 221 and the face image authentication processing unit 216, the same face image is transmitted (a face image authentication process to be described later is automatically successful).

As a method of detecting the face image, various known techniques may be used. For example, "Face detection using Haar-like features" as disclosed in http://www.vision.cs.chubu.ac.jp/cvtutorial/pdf/03objection.pdf at pages 6 to 26 may be used. An outline of "Face detection using Haar-like features" will be described below. A value obtained by subtracting a sum of pixel values in a white color region from a sum of pixel values in a black color region in a rectangle that is a calculation target in a search area is referred to as Haar-Like feature data. The rectangle can be arranged in any position and in any way in the search area; therefore, there are tens of thousands of potential arrangement positions in the search area. With respect to the rectangles, Boosting is applied such that weights are assigned to weak learners in the search area through learning performed in advance and strong learners are generated by selecting only several tens of weak learners in order from the highest importance. Then, whether a certain area is a human's face area or not is determined by the strong learners (by several white-black rectangular patterns indicating the likelihood of a human face).

The face image authentication processing unit 216 performs a face image authentication (face authentication) process for determining whether the face information corresponding to the face image detected by the face image detecting unit 215 is present in the address book information. In this example, the face image authentication processing unit 216, upon receiving the face image from the face image detecting unit 215, transmits an address book information request to request the address book information to the address book information processing unit 213, and receives the address book information in response to the request. The face image authentication processing unit 216 extracts a feature point included in the face image received from the face image detecting unit 215, generates feature point information, and determines whether the generated feature point information (an example of the face information corresponding to the face image) is present in the address book information received from the address book information processing unit 213. Namely, the face image authentication processing unit 216 performs matching of the feature point information the same number of times as the number of users registered in the address book information. Furthermore, when the face image is employed as the face information instead of the feature point information, the face image authentication processing unit 216 determines whether the face image received from the face image detecting unit 215 is present in the address book information received from the address book information processing unit 213. In this case, for example, it may be possible to apply a matching method using pattern recognition in which a single vector represents luminance values of respective pixels in one face image. Examples of the matching method include face image authentication using a subspace method as disclosed in http://www.cvlab.cs.tsukuba.ac.jp/~kfukui/papers/ssii2007.pdf. The face image authentication processing unit 216 transmits a face image authentication result indicating a result of the face image authentication process to the authentication unit 219. In this example, when the result of the face image authentication process is positive, the face image authentication processing unit 216 additionally transmits a corresponding address number to the authentication unit 219.

The tag identification information acquiring unit 217, every time the tag reader 113 reads a tag number, acquires the read tag number from the tag reader 113. The tag identification information acquiring unit 217 transmits the tag number acquired from the tag reader 113 to the wireless tag authentication processing unit 218.

The wireless tag authentication processing unit 218 performs a wireless tag authentication process for determining whether the tag number acquired by the tag identification information acquiring unit 217 is present in the address book information. In this example, the wireless tag authentication processing unit 218 transmits, to the address book information processing unit 213, the tag number acquired from the tag identification information acquiring unit 217, and causes the address book information processing unit 213 to determine whether the tag number is present in the address book information. As described above, the address book information processing unit 213 (the tag number checking unit 220) transmits a corresponding address number to the wireless tag authentication processing unit 218 when the tag number received from the wireless tag authentication processing unit 218 is present in the address book information, and issues an error when the tag number is not present in the address book information. The wireless tag authentication processing unit 218 determines that a result of the wireless tag authentication process is positive when receiving the address number from the address book information processing unit 213, and determines that the result of the wireless tag authentication process is negative when receiving the error. The wireless tag authentication processing unit 218 transmits a wireless tag authentication result indicating the result of the wireless tag authentication process to the authentication unit 219. In this example, when the result of the wireless tag authentication process is positive, the wireless tag authentication processing unit 218 additionally transmits a corresponding address number to the authentication unit 219.

When the tag number acquired by the tag identification information acquiring unit 217 is present in the address book information and the face information (the feature point information in this example) associated with the tag number matches the face information corresponding to the face image detected by the face image detecting unit 215 based on the result of the face image authentication process and the result of the wireless tag authentication process, the authentication unit 219 confirms that the user carrying the wireless tag 114 in which the tag number acquired by the tag identification information acquiring unit 217 is stored is authorized to use the MFP 1 (authenticates the user carrying the wireless tag 114). In this example, when the authentication unit 219 receives the face image authentication result indicating that the result of the face image authentication process is positive from the face image authentication processing unit 216 and receives the wireless tag authentication result indicating that the result of the wireless tag authentication process is positive from the wireless tag authentication processing unit 218, and when the address number provided with the face image authentication result and the address number provided with the wireless tag authentication result match each other, the authentication unit 219 authenticates the user and enables the MFP 1.

FIG. 8 is a flowchart illustrating an example of an operation performed by the PC 2 when the administrator of the MFP 1 registers the default address book information. The administrator displays a screen for registering the address book information (a registration screen) by operating the PC 2, and performs an operation of registering personal information on an unregistered user. The PC 2 that has received the operation performs a process of registering the personal information (Step S1). Subsequently, the administrator performs an operation of registering the tag number of the wireless tag 114 to be distributed to the user whose personal information has been registered at Step S1. The PC 2 that has received the operation performs a process of registering the tag number in association with the personal information registered at Step S1 (Step S2). Then, the PC 2 performs a process of updating the default address book information (a process of updating the address book information in the storage unit) (Step S3).

Figure 9:
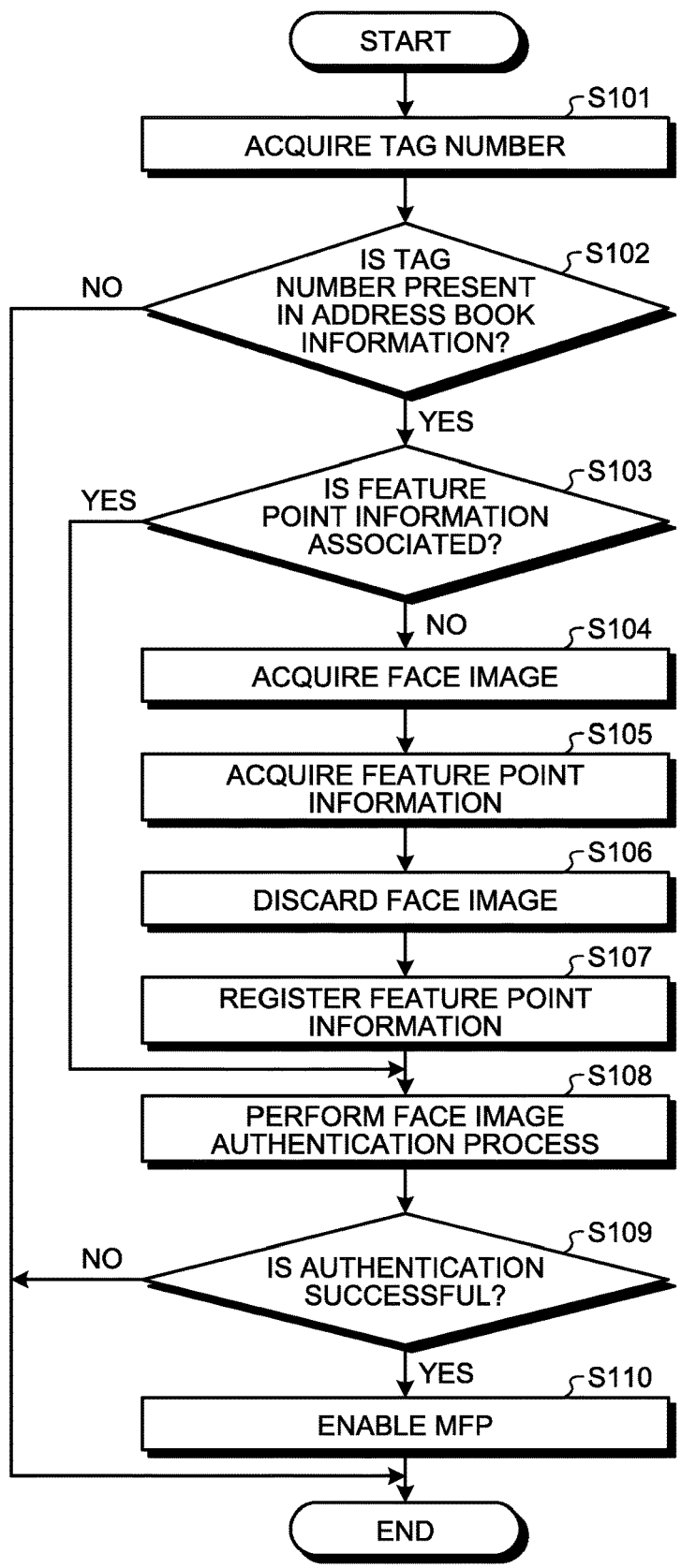
FIG. 9 is a flowchart illustrating an example of an operation performed by the MFP according to the first embodiment.

FIG. 9 is a flowchart illustrating an example of an operation performed by the MFP 1 when the user carrying the wireless tag 114 passes the user's own wireless tag 114 over the tag reader 113. Details of the processes at Steps are already described above, and therefore the same explanation will be omitted appropriately. As illustrated in FIG. 9, the tag identification information acquiring unit 217 acquires the tag number from the tag reader 113 (Step S101). Subsequently, the tag number checking unit 220 determines whether the tag number acquired at Step S101 is present in the address book information (Step S102). If a result at Step S102 is negative (NO at Step S102), the authentication consequently fails (here, described as the end of the process). If the result at Step S102 is positive (YES at Step S102), the face information acquiring unit 221 refers to the address book information and checks whether the feature point information is associated with the tag number acquired at Step S101 (Step S103). Furthermore, if the result at Step S102 is positive (YES at Step S102), the tag number checking unit 220 transmits a corresponding address number to the wireless tag authentication processing unit 218. As described above, when receiving the address number from the address book information processing unit 213 (the tag number checking unit 220), the wireless tag authentication processing unit 218 determines that the result of the wireless tag authentication process is positive, and transmits the wireless tag authentication result indicating the result of the wireless tag authentication process to the authentication unit 219.

If a result at Step S103 is negative (NO at Step S103), the face information acquiring unit 221 acquires a face image from the face image detecting unit 215 (Step S104), and acquires (generates) the feature point information by extracting a feature point included in the acquired face image (Step S105). Thereafter, the face information acquiring unit 221 discards the face image acquired from the face image detecting unit 215 (Step S106). The registration control unit 222 controls registration of the feature point information acquired at Step S105 and the tag number acquired at Step S101 in the address book information in an associated manner (Step S107). Then, the process proceeds to Step S108.

If the result at Step S103 is positive (YES at Step S103), or after the process at Step S107, the face image authentication processing unit 216 performs the face image authentication process (Step S108), and transmits the face image authentication result indicating the result of the face image authentication process to the authentication unit 219. Then, the authentication unit 219 determines whether the authentication is successful based on the result of the face image authentication process and the result of the wireless tag authentication process (Step S109). If a result at Step S109 is positive (YES at Step S109), the authentication unit 219 enables the MFP 1 (Step S110). If the result at Step S109 is negative (NO at Step S109), the process ends.

As described above, in the first embodiment, when the feature point information is not associated, in advance, with the tag number stored in the wireless tag 114 passed over the tag reader 113 (the tag number acquired by the tag identification information acquiring unit 217), the feature point information is acquired based on a captured image that is obtained by capturing an image of an imaging range corresponding to a range in which the tag number can be acquired (a range in which the tag reader 113 and the wireless tag 114 can perform wireless communication), and the acquired feature point information is registered in the address book information in association with the tag number. With this operation, it becomes possible to reduce the workload on the administrator of the MFP 1, and improve the efficiency of the process of registering the face information used for the face authentication (the feature point information in this example).

For example, in a certain company, when the above-described address book information is to be registered in an MFP installed in the certain company, it may be possible to extract and register the feature point information by using a photograph captured for an employee ID card for each employee. However, when the photograph for the employee ID card is not captured in a certain company or when the resolution of the photograph is low and the feature point information is not obtainable, it may be difficult to generate the address book information and perform face authentication appropriately. In this case, if an administrator of the apparatus is required to perform photography and an operation of registering the feature point information extracted from images (photographs) obtained through the photography in association with the tag number, the workload on the administrator increases. In contrast, according to the first embodiment as described above, it is possible to reduce the workload on the administrator and appropriately perform face authentication.

While the embodiment of the present invention has been described above, the present invention is not limited to the embodiment as it is, and may be embodied by modifying the components within the scope of the invention. Furthermore, various modifications may be embodied by appropriately combining a plurality of components described in the embodiment. For example, it may be possible to remove some components from all of the components described in the embodiment.

Furthermore, while the main body 10 and the operating unit 20 operate independently of each other on different operating systems (OS) in the above-described embodiment, the present invention is not limited by this example. For example, the main body 10 and the operating unit 20 may operate on the same OS.

Moreover, a program executed by the MFP 1 of the above-described embodiment may be provided by being recorded in a computer readable recording medium, such as a compact disc-ROM (CD-ROM), a flexible disk (FD), a CD-recordable (CD-R), a digital versatile disk (DVD), or a universal serial bus (USB), in a computer-installable or computer-executable file format, or may be provided or distributed via a network, such as the Internet. Furthermore, various kinds of programs may be provided by being incorporated in a non-volatile recording medium, such as a ROM, in advance.

Other embodiment will be described below with reference to the drawings. The same components with the same or equivalent functions and effects as those of the first embodiment will be denoted by the same symbols, and explanation thereof will be omitted.

Second Embodiment

Figure 10:
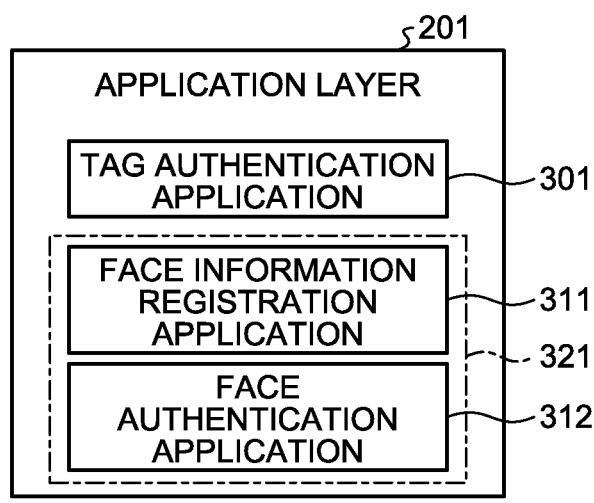
FIG. 10 is a diagram illustrating a configuration example of an application layer of an operating unit according to a second embodiment.

FIG. 10 is a diagram illustrating a configuration example of an application layer 201 according to a second embodiment. The application layer 201 according to the second embodiment includes a tag authentication application 301, a face information registration application 311, and a face authentication application 312. The tag authentication application 301, the face information registration application 311, and the face authentication application 312 operate on the OS layer 203 (the second operating system). The face information registration application 311 and the face authentication application 312 may be constructed as a single application (an integrated application 321).

While an example in which all of the tag authentication application 301, the face information registration application 311, and the face authentication application 312 are included in the application layer 201 is described herein, the software configuration of the second embodiment is not limited to this example. For example, at least a part of the tag authentication application 301, the face information registration application 311, and the face authentication application 312 may be included in the service layer 202.

Figure 11:
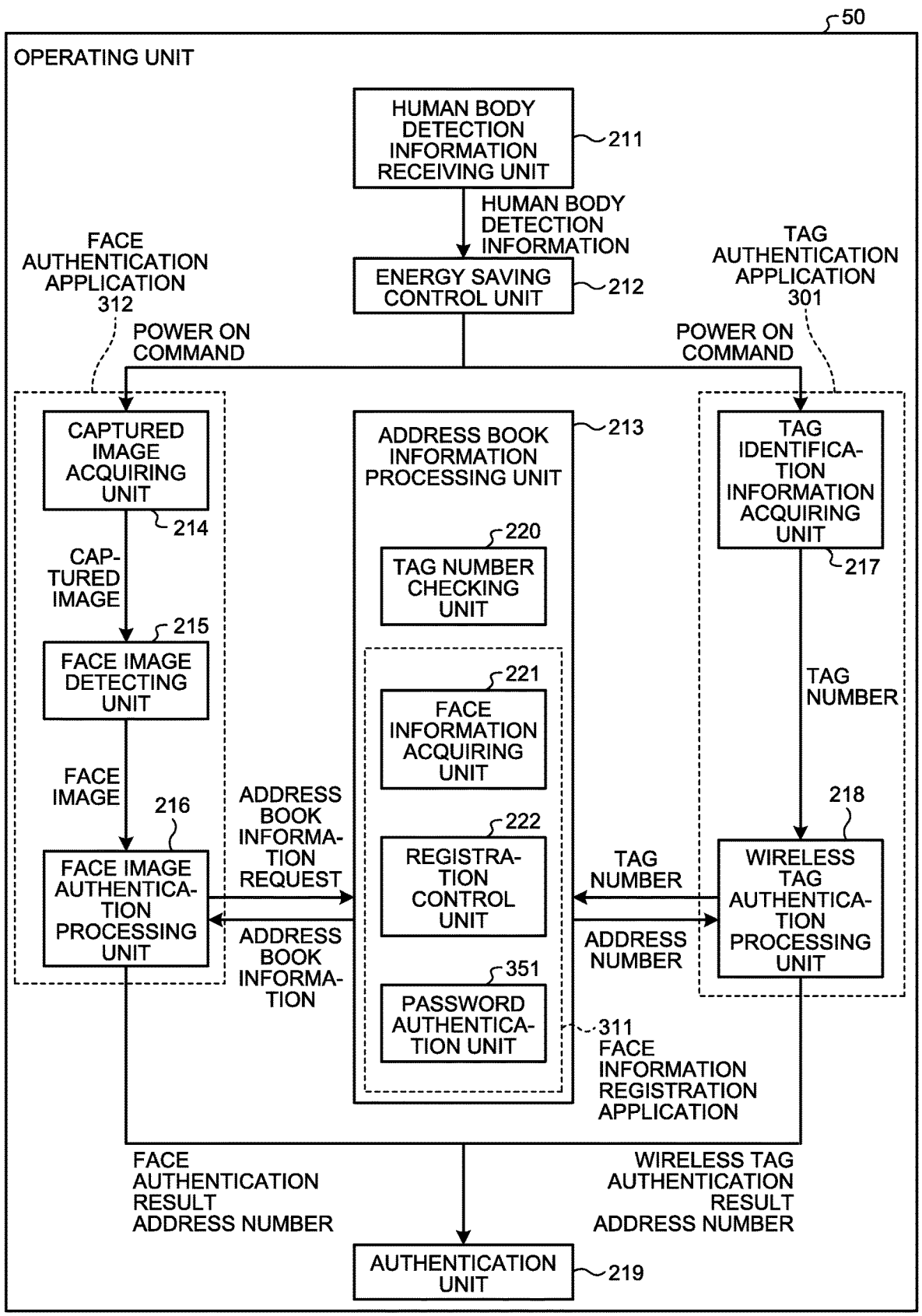
FIG. 11 is a diagram illustrating an example of relationships between functions of the operating unit and applications according to the second embodiment.

FIG. 11 is a diagram illustrating an example of relationships between functions of an operating unit 50 and the applications according to the second embodiment. The tag authentication application 301 includes the tag identification information acquiring unit 217 and the wireless tag authentication processing unit 218. The tag authentication application 301 performs tag authentication by comparing the tag number (the tag identification information) acquired by the tag identification information acquiring unit 217 and the tag number included in the address book information.

The face information registration application 311 includes the face information acquiring unit 221, the registration control unit 222, and a password authentication unit 351. The password authentication unit 351 performs password authentication by comparing a password that is input by a user when a face image of the user is captured after the tag authentication is performed by the tag authentication application 301 with a password that is associated with the tag number in the address book information. When the password authentication is successful, the registration control unit 222 permits control for registering the face information to the address book information in association with the tag number.

The face authentication application 312 includes the captured image acquiring unit 214, the face image detecting unit 215, and the face image authentication processing unit 216. The face authentication application 312 detects a face image from a captured image, and determines whether face information corresponding to the detected face image is present in the address book information.

Figure 12:
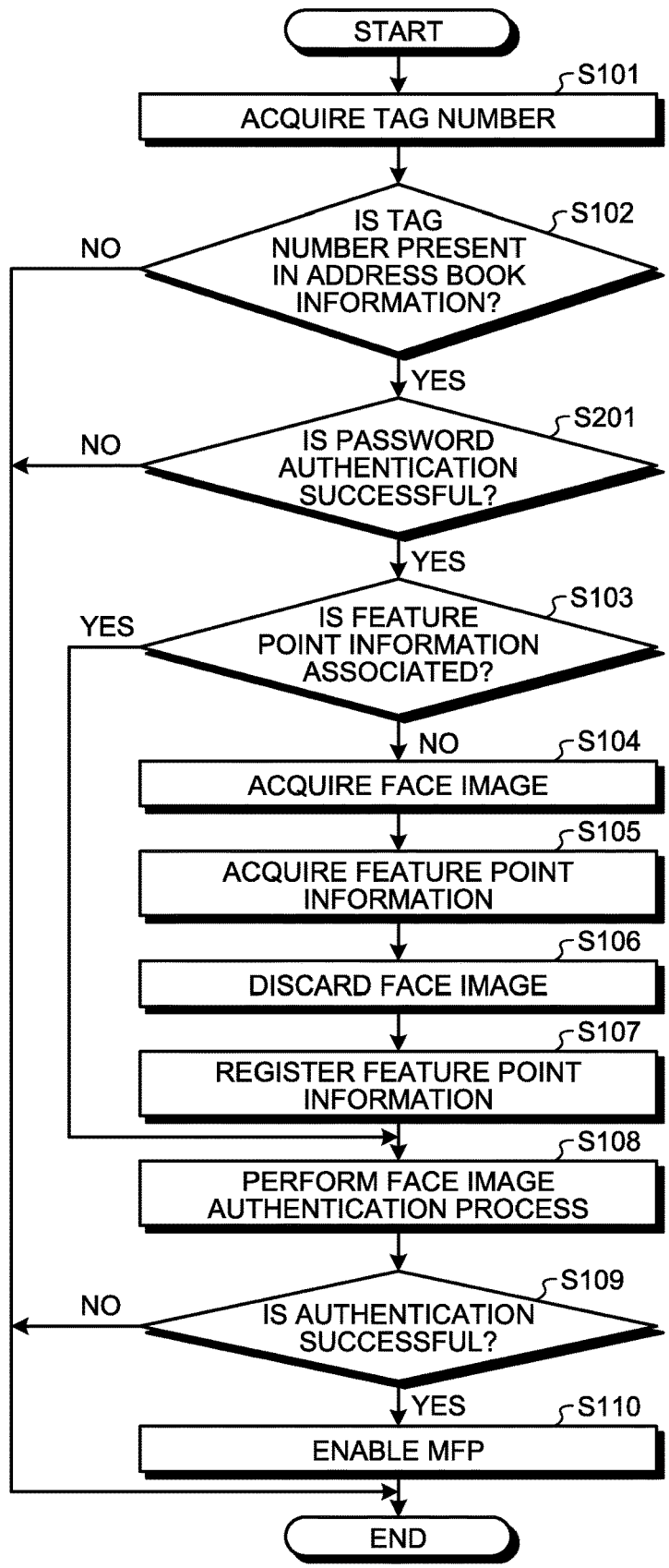
FIG. 12 is a flowchart illustrating an example of an operation performed by an MFP according to the second embodiment.

FIG. 12 is a flowchart illustrating an example of an operation performed by the MFP 1 according to the second embodiment. The flowchart according to the second embodiment is different from the flowchart according to the first embodiment illustrated in FIG. 9 in that Step S201 is added between Step S102 and Step S103. If the result at Step S102 is positive (YES at Step S102), that is, if the tag number checking unit 220 determines that the tag number acquired at Step S101 is present in the address book information, the password authentication unit 351 compares a password that is input by a user after the tag authentication with a password that is associated with the tag number acquired at Step S101, and determines whether the password authentication is successful (S201). If a result at Step S201 is positive (YES at Step S201), that is, if the password input by the user and the password associated with the tag number match each other, the process at Step S103 (the process performed by the face information acquiring unit 221 to determine whether the feature point information is associated with the tag number) is performed. If the result at Step S201 is negative (NO at S201), that is, if the password input by the user and the password associated with the tag number do not match each other, the authentication consequently fails.

According to the second embodiment, the processes related to the authentication (the tag authentication using the tag information, the acquisition/registration of the face information on a user, the face authentication using the face information, and the like) are performed by the applications (the tag authentication application 301, the face information registration application 311, the face authentication application 312, and the like) that operate on the OS layer 203 (the second operating system) of the operating unit 50. The OS layer 203 of the operating unit 50 operates independently of the OS layer 103 (the first operating system) of the main body 10. Therefore, it is possible to perform the processes related to the authentication independently of the main body 10, so that it is possible to improve the operational performance for making a setting related to the authentication, maintenance, or the like. Furthermore, according to the second embodiment, the password authentication unit 351 performs the password authentication after the tag authentication, and the face information is registered when the password authentication is successful; therefore, it is possible to improve the security as compared to the first embodiment.

According to an embodiment of the present invention, it is possible to improve the efficiency of an operation of registering face information used for face authentication.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image forming apparatus including a scanner, the image forming apparatus comprising:
a camera configured to capture a captured image;
a tag reader configured to capture tag identification information from a wireless tag, the tag identification information identifying the wireless tag;
a storage unit configured to store an address book, the address book allowing storage of address book information including personal information on a user, the tag identification information, and face information of the user associated with each other; and
first processing circuitry configured to cause the image forming apparatus to,
receive updated address book information from an external information processing apparatus, the updated address book information including at least an added personal information and an added tag identification information of a new user of the image forming apparatus,
update the address book with the updated address book information,
acquire the tag identification information,
determine whether face information on the user is associated with the tag identification,
perform a user authentication,
acquire the face information, if the face information on the user is not associated with the added tag identification information based on the determination and if the user authentication is successful, based on the captured image, and
register the face information acquired by the camera in the updated address book information in association with the added personal information and the tag identification information from the external information processing apparatus without requiring further input for another user authentication from the user after the user authentication.

2. The image forming apparatus according to claim 1, wherein the first processing circuitry is further configured to cause the image forming apparatus to,
acquire the captured image,
detect a face image from the captured image, and
acquire the face information based on the face image.

3. The image forming apparatus according to claim 2, wherein the first processing circuitry is further configured to cause the image forming apparatus to perform a face image authentication process for determining whether the face information corresponding to the face image is present in the address book information.

4. The image forming apparatus according to claim 3, wherein the first processing circuitry is further configured to cause the image forming apparatus to perform a wireless tag authentication process for determining whether the tag identification information is present in the address book information.

5. The image forming apparatus according to claim 4, wherein the first processing circuitry is further configured to cause the image forming apparatus to,
determine whether the user carrying the wireless tag is authorized to use the image forming apparatus by determining whether the tag identification information is present in the address book information and the face information associated with the tag identification information matches the face information corresponding to the face image based on a result of the face image authentication process and a result of the wireless tag authentication process.

6. The image forming apparatus according to claim 1, further comprising:
an operating unit including the first processing circuitry, the first processing circuitry further configured to receive an operation; and
a main body including second processing circuitry, the second processing circuitry configured to operate in accordance with the operation, wherein
the operating unit is connectable to the main body in an attachable/detachable manner.

7. The image forming apparatus according to claim 1, further comprising:
an operating unit including the first processing circuitry, the first processing circuitry further configured to cause the image forming apparatus to
control a first operating system, perform tag authentication by comparing the tag identification information with the tag identification information included in the address book information, and
receive an operation; and
a main body including,
second processing circuitry, the second processing circuitry configured to control a second operating system, and
operate in accordance with the operation received by the first processing circuitry,
an engine unit configured to be controlled by the second processing circuitry, and function as one of a scanner and a printer, and
the storage unit, wherein
the operating unit is connectable to the main body in an attachable/detachable manner.

8. The image forming apparatus according to claim 7, wherein
the first processing circuitry is further configured to cause the image forming apparatus to,
acquire the captured image,
detect a face image from the captured image, and
determine whether the face information corresponding to the face image is present in the address book information.

9. An information processing system comprising:
a camera configured to capture a captured image;
a tag reader configured to capture tag identification information from a wireless tag, the tag identification information identifying the wireless tag;
a storage unit configured to store an address book, the address book allowing storage of address book information including personal information on a user, the tag identification information, and face information of the user associated with each other; and
first processing circuitry configured to,
receive updated address book information from an information processing apparatus, the information processing apparatus external to the first processing circuitry, the updated address book information including at least an added personal information and an added tag identification information of a new user of the information processing system,
update the address book with the updated address book information,
acquire the tag identification information,
determine whether face information on the user is associated with the tag identification information,
perform a user authentication,
acquire the face information, if the face information on the user is not associated with the added tag identification information based on the determination and if the user authentication is successful, based on the captured image, and
register the face information acquired by the camera in the updated address book information in association with the added personal information and the added tag identification information without requiring further input for another user authentication from the user after the user authentication.

10. An information processing method comprising:
acquiring tag identification information for identifying a wireless tag that indicates a medium capable of performing wireless communication;
referring to an address book storing address book information in which at least the tag identification information and personal information on a user are associated with each other;
receiving updated address book information, the updated address book information including at least an added personal information and an added tag identification information of a new user;
updating the address book with the updated address book information;
determining whether face information on the user is associated with the tag identification information;
performing a user authentication;
acquiring the face information, if the face information on the user is not associated with the added tag identification information based on the determination and if the user authentication is successful, based on a captured; and
registering the face information acquired at the acquiring in the updated address book information in association with the added personal information and the added tag identification information without requiring further input for another user authentication from the user after the user authentication.

11. A non-transitory computer-readable recording medium storing a plurality of instructions which, in response to execution by one or more processors, causes the one or more processors to execute the information processing method according to claim 10.

12. The image forming apparatus according to claim 6, wherein the main body includes a pyroelectric sensor configured to detect presence or absence of a human body in a detection range.

13. The image forming apparatus according to claim 6, wherein the operating unit is one of a smartphone or a tablet terminal.

14. The image forming apparatus according to claim 1, wherein the first processing circuitry is further configured to cause the image forming apparatus to perform the user authentication based on the tag identification information, the tag identification information being obtained by the image forming apparatus by wireless communication.

15. The image forming apparatus according to claim 1, wherein the first processing circuitry is further configured to cause the image forming apparatus to perform the user authentication based on the tag identification information, the tag identification information being obtained by the image forming apparatus via an operation panel of the image forming apparatus.

16. The image forming apparatus according to claim 1, wherein the first processing circuitry is further configured to cause the image forming apparatus to:
- discard the captured image after acquiring the face information;
- capture a second image;
- acquire second face information based on the second image; and
- allow use of the image forming apparatus, based on a determination that the second face information matches the face information registered in the updated address book information in association with the tag identification information.

* * * * *